HELICOPTER WITH AUTOROTATIVE AIRFOIL AND TORQUE-GENERATING MEANS

Filed Sept. 26, 1962 16 Sheets-Sheet 1

HELICOPTER WITH AUTOROTATIVE AIRFOIL AND TORQUE-GENERATING MEANS

Filed Sept. 26, 1962 16 Sheets-Sheet 2

HELICOPTER WITH AUTOROTATIVE AIRFOIL AND TORQUE-GENERATING MEANS

Filed Sept. 26, 1962 16 Sheets-Sheet 5

Oct. 12, 1965 N. LAING ET AL 3,211,397

HELICOPTER WITH AUTOROTATIVE AIRFOIL AND TORQUE-GENERATING MEANS

Filed Sept. 26, 1962 16 Sheets-Sheet 6

Oct. 12, 1965 N. LAING ETAL 3,211,397

HELICOPTER WITH AUTOROTATIVE AIRFOIL AND TORQUE-GENERATING MEANS

Filed Sept. 26, 1962 16 Sheets-Sheet 7

HELICOPTER WITH AUTOROTATIVE AIRFOIL AND TORQUE-GENERATING MEANS

Filed Sept. 26, 1962

Oct. 12, 1965 N. LAING ETAL 3,211,397

HELICOPTER WITH AUTOROTATIVE AIRFOIL AND TORQUE-GENERATING MEANS

Filed Sept. 26, 1962 16 Sheets-Sheet 16

United States Patent Office 3,211,397

Patented Oct. 12, 1965

3,211,397

HELICOPTER WITH AUTOROTATIVE AIRFOIL AND TORQUE-GENERATING MEANS

Nikolaus Laing, 7141 Aldengen, Hofener Weg 35, Germany, and Götz Heidelberg, Ranhazweg 23, Ottobrunn, near Munich, Germany Filed Sept. 26, 1962, Ser. No. 227,633
Claims priority, application Germany, Dec. 7, 1956, L 26,396; Dec. 24, 1956, L 26,504; Dec. 8, 1956, H 28,761
14 Claims. (Cl. 244—17.19)

This application is a continuation-in-part of our application Serial No. 701,629 filed December 9, 1957, now abandoned.

This invention relates to jet-propelled helicopters, and its main object is to provide such a helicopter which is capable of effective control on autorotation of the rotor consequent upon a failure of the power source.

The invention accordingly provides a jet-propelled helicopter comprising a fuselage, a power source and a bladed rotor mounted on the fuselage and normally driven by the power source. The invention is characterized as to its novelty by a structure (1) wherein each blade is hollow and has at its rear edge a slot extending inwardly from adjacent the blade tip; (2) wherein a flap is pivotally mounted at each slot to extend therealong and to control the direction of the jet issuing from the slot, the helicopter including control means to move the flaps cyclically and collectively; (3) wherein the power source functions to develop operating pressure in the hollow blade for the production of said jet which operating pressure is so low that in autorotation of the rotor upon failure of the power source the pressure produced by the rotor-pump effect averaged over the length of the slot is sufficiently close to said operating pressure similarly averaged that the helicopter may still be controlled by said control means without change of blade angle, and (4) wherein the arrangement provides for little resistance to air entering the interior of the hollow blade in autorotation of the rotor.

Pressure is produced in the hollow blade at any point along the slot by reason simply of its rotation (called herein the rotor-pump effect). The pressure on autorotation of the rotor must be fairly close to magnitude as the total pressure produced at that point in normal operation of the power source. The pressure produced by the operation of the power source alone (i.e. apart from the rotor-pump effect) is therefore low, but the volume of air passing must be great. The slots must therefore be large and so must the cross-sectional areas through which air is conveyed to them.

In a typical rotor blade for use in a helicopter according to the invention, the slot extends from at least half way along the blade to the tip and the blade is rectangular in plan. Going inwardly from the tip towards the rotor axis the profile increases progressively in cross-section since over the slotted part of the blade the further inward the measurement is taken, the greater is the volume of air traversing the cross-section; once the slot is passed there is no further increase in profile thickness.

The invention contemplates high peripheral blade speeds. This means that the flaps need only be moved through small angles; consequently the component of jet velocity in the plane of rotation of the rotor will be great so that the driving efficiency of the rotor will be good and little affected by operation of the control means.

The pressure gradient of the air inside the blade is the gradient of the pressure due simply to rotor-pump effect along the radius from the rotor axis. Consequently there will be an increase of jet velocity in the direction of the blade tip. Since the pressure produced by operation of the power source alone is low, the jet velocity at any point along the slot will not be very much greater than the peripheral speed at that point. This leads to a jet efficiency which could not be obtained in a system where the power source generated a high pressure.

In autorotation the rotor pump action will be effective to produce a jet which at any point along the slot has a velocity about equal to the peripheral speed at that point. Once again small angular movements of the flaps will suffice to keep the helicopter under control. Moreover, since the jet velocity is once again directed at only small angles to the plane of rotation, the power absorbed by the rotor by reason of the rotor pump action thereof will be in large measure recovered by thrust from the jet.

It will be appreciated that in normal operation the power to rotate the rotor is taken from the power source, and in autorotation of the rotor it is due to forces set up upon the rotor by the ambient air as the helicopter loses height. The blade angle is determined so that the effective lift coefficient (which is dependent also on jet velocity and angle) suits the conditions prevailing in autorotation. Thus when the power source shuts down, the required conditions for a controlled rotation are automatically present, and there is no need to change the blade angle.

In the following description various means are described for producing the jet; various forms of control means for the flap are then discussed, followed by means for controlling the fuselage about the rotor axis. In the accompanying drawings:

FIGURE 1 is a side elevation of a rotor blade for a helicopter according to the invention;

FIGURE 1*a* is a plan view of the blade of FIG. 1;

FIGURES 1*b*, 1*c* and 1*d* are sections through the blade taken on the section lines *b*—*b*, *c*—*c* and *d*—*d*, respectively of FIGURE 1;

FIGURE 1*e* is a cross-section of an alternative form of blade;

FIGURE 1*f* is a diagram of velocity distribution in the blade;

FIGURE 2*a* is an axial section of a motor-driven blower;

FIGURE 2*b* is a transverse section of the blower taken through an impeller forming part thereof;

FIGURE 3 is an axial section through a rotor hub showing valve means therein;

FIGURES 4*a* and 4*b* are respectively a partial-axial section and a partial-plan view of a cylindrical conduit including non-return valve means for location between a blower and rotor hub;

FIGURE 5*a* is an axial section through a rotor hub and gas-turbine drive means therefor;

FIGURE 5*b* is a section taken on the lines 5*b*—5*b* of FIGURE 5*a*;

FIGURE 6*a* is a vertical section of a rotor hub and a single blade attached thereto showing jet-producing means in the blade;

FIGURE 6*b* is a plan view of the hub and blade with parts broken away;

Figures 1, 1A, 1B, 1F:
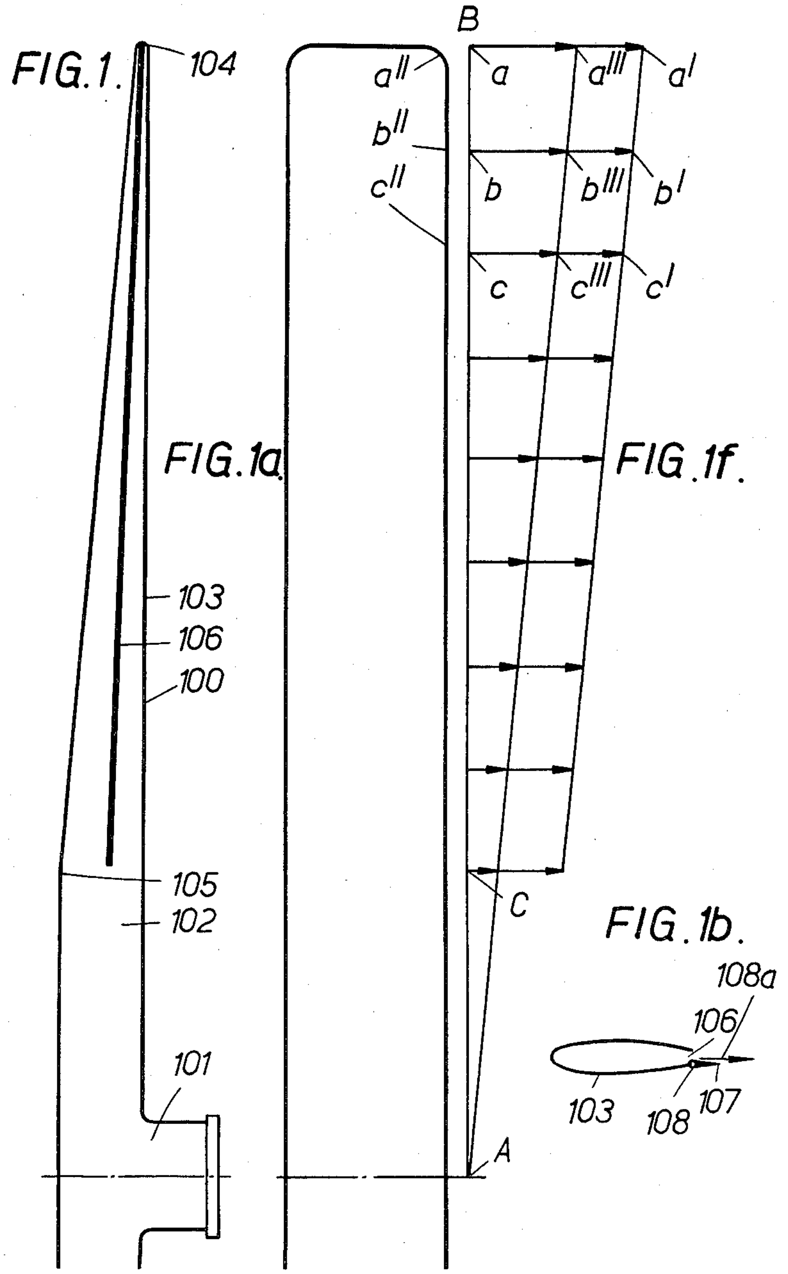

Referring to the drawings FIGURES 1, 1*a*, 1*b*, 1*c* and 1*d* show a helicopter blade 100 supported on a hub 101 without provision for variation of the angle of the blade as a whole. The blade 100 is rectangular in plan and includes a radially inner portion 102 of constant cross-section and an outer portion 103 the cross-section of which tapers steadily to a thin tip 104 from the point 105 where the blade portions merge. The outer portion 103 accounts, as FIGURE 1 shows, for more than two thirds of the length of the blade going from the tip. As will be seen from FIGURES 1*b*, 1*c* and 1*d* the cross-section of the inner blade portion 102 is that of a thick airfoil (FIGURE 1*d*) and the blade cross-section diminishes therefrom progressively radially outwardly from the region 105, becoming a thin aerofoil (FIGURE 1*b*) near its tip. The blade 100 is hollow over its whole cross-section from the hub 101 to the tip 104 and is supplied through the hub (which is also hollow) with air under pressure. Blowers for producing this pressure air supply are described subsequently.

A slot 106 of constant cross-section extends along the rear edge of the outer blade portion 103 from the tip 104 to the point 105. A flap 107 (shown only in FIGURES 1*b* and 1*c*) having the same dimensions over the whole of its length extends along the entire length of the slot 106, being pivoted at the lower edge thereof and as shown at 108 in FIGURES 1*b* and 1*c*. Air issues from the slot-like nozzle 106 in a long flat jet which flows over the upper side of the flap 107, the direction taken by this jet being accordingly determined by the angle at which the flap is set. The flap 107 is shown in a central or neutral position in FIGURE 1*b*; in this position of the flap the jet emerges from the slot 106 undeflected, as shown by the arrow 108*a*. The flap 107 can however be moved to the position shown in FIGURE 1*c* wherein the jet is deflected downwardly as shown by the arrow 109. The jet emerging from slot 106 causes the blade to rotate, while the flap 107 controls the direction of the jet and also the lift of the blade portion 103; the flap forms the sole control element for the blade.

It should be noted that the flap is small; its width is only about one sixth of the blade chord, and it does not form part of the otherwise continuous blade profile.

The jet velocity at different points along the slot is represented diagrammatically in FIGURE 1*f*, the line AB representing the length of the blade 100, the part thereof CB representing the length of the slot 106, and the vector lines *a, a', b, b', c, c', etc.* representing the total velocity of the jet at the points *a'', b'', c''*, etc. along the length of the slot. To facilitate the understanding of the figures, the line AB is drawn on the same scale as the blade is shown in FIGURES 1 and 1*a*. The lines *a, a''', b, b''', c, c'''*, etc. represent the velocity components due to the aforementioned rotor-pump effect; the lines *a''', a', b''', b', c''', c'*, etc. represent the velocity components due to work done by the blower. Thus in autorotation of the rotor without loss of rotor speed the velocities will be as shown at *a, a'', b, b''', c, c'''*, etc. Taking an average over the length of the slot, the autorotation velocities are therefore of the same order of magnitude as the velocities occurring in normal operation with the blower functioning. What is true of the velocities is true also of the pressures; the average pressure produced along the slot 106 by the rotor-pump effect is of the same order of magnitude as the average total pressure produced in normal operation with the blower functioning. Therefore if the blower stops or is stopped in flight, the pressure produced by the rotor pump effect is sufficiently close to the total pressure in normal operation that the helicopter can still be controlled with the aid of the flap 107 on each blade and no change in the angle of the blade as a whole is required.

The pressure produced by the blower should in general be less than twice the pressure due to the rotor-pump effect at the tip 104 of the blade.

The inner blade portion 102 preferably has a slot 110 (shown only in FIGURE 1*d*) along its rear edge, this slot being as shown appreciably narrower than the slot 106. The jet emerging from this slot is uncontrolled and serves to reduce boundary-layer separation at the suction surface of the blade portion 102.

Figures 1C, 1D, 1E, 2A, 2B:
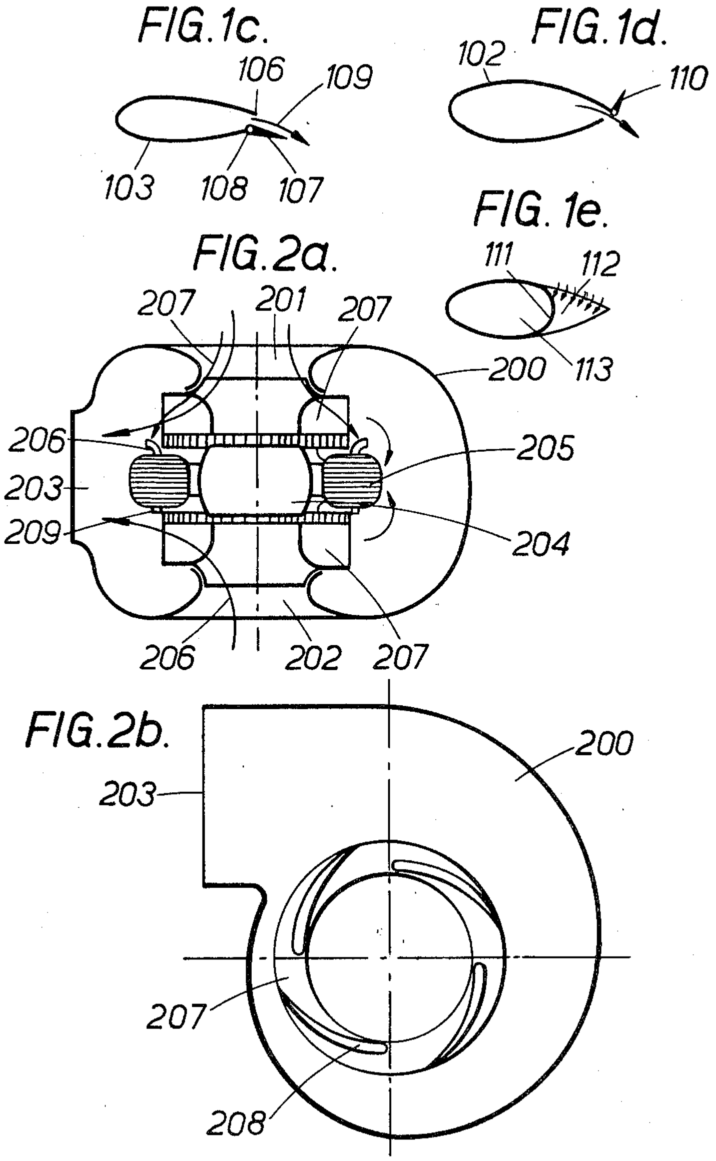

An alternative method of reducing boundary-layer separation at the blade portion 102 is to apply suction over the rear part of the suction surface; this alternative method is shown in FIGURE 1*e*. This method requires a longitudinal partition 111 within the airfoil portion 102, providing thus a suction conduit 112 under the rear part of the suction surface and a pressure conduit 113 to supply air to the slot 106.

Because of the comparatively low air pressures in carrying out this invention the cross-section of the air passages must be generous. It is also required that air flow should not be impeded during rotation of the rotor with the blower out of action. To satisfy this requirement the blower can be designed to present little obstruction when stopped, or a by-pass can be provided.

FIGURES 2*a* and 2*b* show a blower unit providing negligible obstruction when stopped. A volute 200 provides opposed axial intake openings 201, 202 and a delivery-duct portion 203 for connection to the rotor hub. Symmetrically between the intake openings 201, 202 is disposed an internal-combustion engine 204 having air-cooled cylinders 205 discharging exhaust direct into the interior of the volute 200 through exhaust pipes 206, the air intake for the engine being on the pressure side of the blower. The crankshaft of the engine 204 is aligned on the axis of the volute 200 and drives a pair of similar impellers 207 one on either side of the engine and each receiving air axially from one of the intake openings 201, 202 and discharging it radially into the volute, as shown by the arrows. Each impeller 207 has only four blades 208 set at a very large angle to the radius through the leading edge; the impellers thus produce little resistance to air flow when stationary.

This arrangement ensures that the engine affords minimum obstruction, while providing adequate cooling of the cylinders 205 by the rapid circulation of air in the volute. By discharging the exhaust from the engine into the volute the waste heat from the engine is exploited to add to the energy of the air supplied to the rotor blades.

Figure 3:
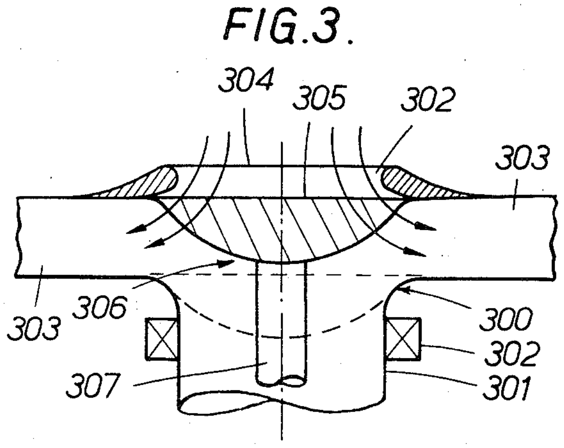

FIGURE 3 shows a rotor hub designated generally 300; the hub is integral with a hollow supporting shaft 301 mounted for rotation in a bearing schematically indicated at 302. The root portions of two hollow rotor blades 303 are shown mounted on the hub 300, their interiors communicating with the interior of the shaft 301. A blower (not shown), having a high resistance to throughflow when stopped, supplies air to the rotor blades 303 through the hollow shaft 301. The top of the hub 300 presents an axial opening 304 normally closed by the head 305 of a valve member shown generally at 306 and having a stem 307 guided for movement axially of the shaft 301. The underside of the head 305 is rounded to help guide air from the interior of the shaft 301 into the rotor blades 302 when the head is positioned to close the opening 304. The pressure developed by the blower when operating is sufficient to hold the valve head 305 in position to close the opening 304 but when the blower stops the consequent drop in pressure allows the valve 306 to drop so that the shaft 301 is blocked off and air then enters the rotor blades 302 through the opening 304 due to the rotor pump effect. Thus despite the resistance to flow presented by the stationary blower air can enter the blades 302 with little resistance when the blower stops, the air then by-passing the blower.

Figure 4A:
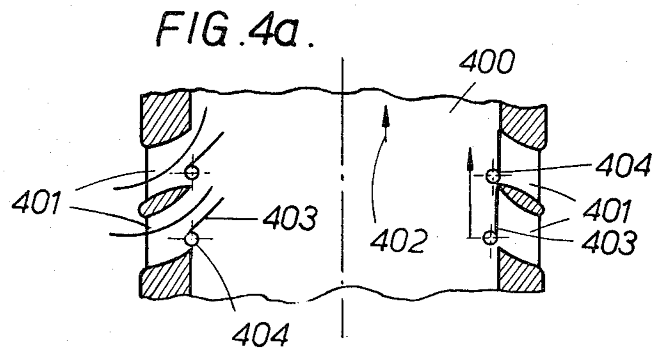
Figure 4B:
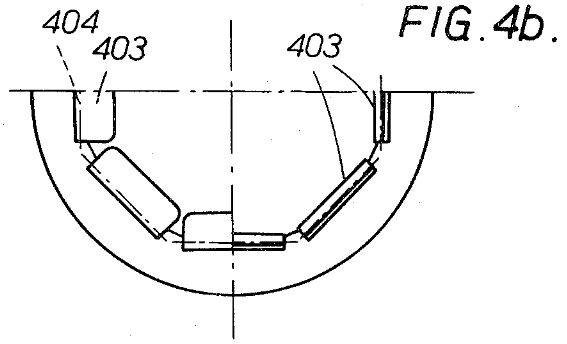

FIGURES 4*a* and 4*b* show a valve arrangement located in a cylindrical conduit 400 situated between a blower (not shown) and a rotor hub (also not shown). A series of holes 401 which, seen frontally, appear rectangular are distributed around the periphery of the conduit 400; for clarity in FIGURE 4*a*, only the holes intersected by the cross-section plane are shown. The direction of flow in the conduit 400 is shown by the arrow 402, and the holes 401 are formed obliquely through the thickness of the conduit wall so that air is led through those holes at an acute angle to this direction. Flaps 403 are pivoted at the inside upstream edge 404 of each hole 401 (i.e. upstream as regards flow through the conduit 400 when the blower is operating). When the blower operates, pressure set up thereby in the conduit 400 keeps the flaps 403 in position to close the holes 401, as shown to the right of the centre line in FIGURES 4*a* and 4*b*. If the blower stops the rotor pump effect produces a suction within the conduit 400 (assuming appreciable resistance to flow in the blower) which suction causes the flaps 403 to open as shown to the left of the centre line in FIGURES 4*a* and 4*b*. Thus despite resistance to flow in the stationary blower air can enter the blades with little pressure drop.

Figure 5A:
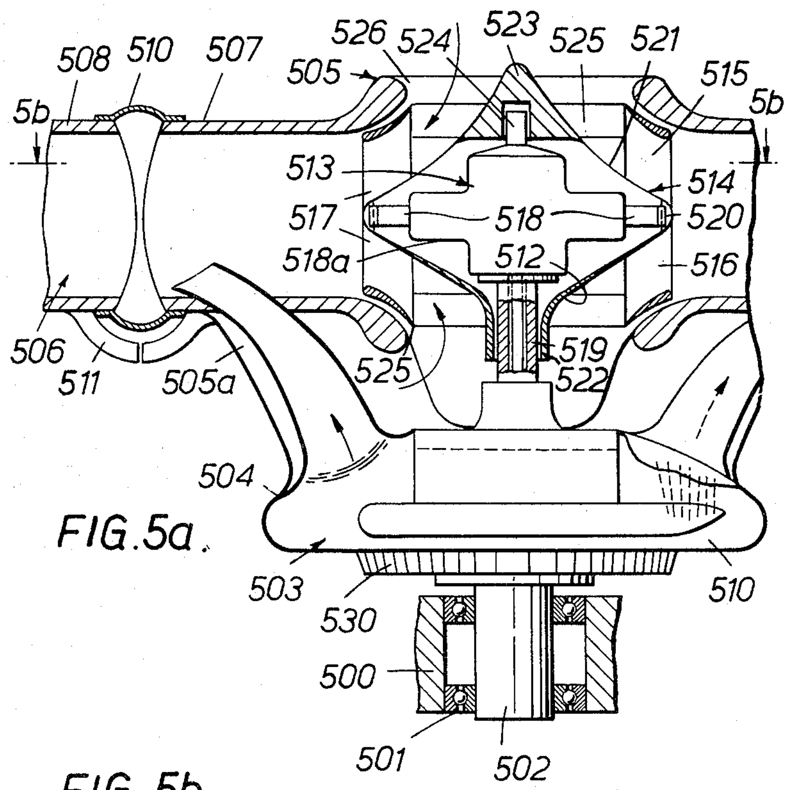
Figure 5B:
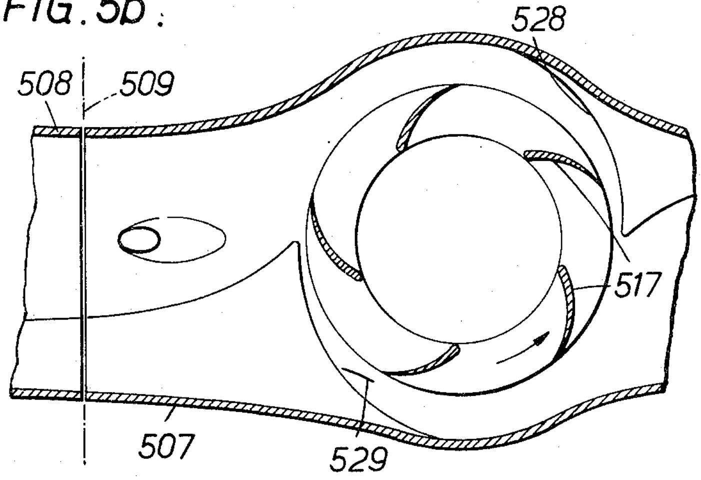

FIGURES 5*a* and 5*b* show a rotor hub and drive assembly. A non-rotating part 500 of a helicopter mounts a bearing 501 supporting a shaft 502. A gas turbine designated generally 503 comprises a casing 504 rigid with the shaft 502. The rotor hub proper, designated generally 505, is mounted on the turbine casing 504 by means of hollow arms **505*a* and supports a pair of hollow blades 506, the root portions 507 of which are rigid with the hub 505. The main portions 508 of the blades 506 are mounted on the root portions 507 by means of leaf springs (not shown) to pivot slightly in a vertical plane about axes as shown at 509 which are horizontal and transverse to blade. Fluid-tight connection between the main portions 508 and root portions 507 of the blades is ensured by flexible rubber rings 510 bridging a slight gap between those portions. Downward pivoting of the main blade portions 508 about the axes 509 is limited by brackets 511 at the lower sides of the blade portion 507, 508; these brackets abut in the lowermost position of blade portions 508**.

The turbine wheel (not shown) of the gas turbine 503 drives directly a spindle 512 which is coaxial with the shaft 502 and extends into the hub 505. A planetary-gear transmission shown generally at 513 transmits drive from the spindle 512 to a double centrifugal impeller unit 514 having integral upper and lower portions 515, 516 each with a small number of steep-pitch blades 517. The planet gears 518 of the transmission 513 are rotatably mounted in a housing **518*a* and are rigid with a hollow shaft 519 connected to the turbine casing 504, the drive spindle 512 extending coaxially through the shaft 519. The impeller unit 514 carries an internally toothed gear ring 521 meshing with the planet wheels 518 and includes an inner shroud 521 providing a first bearing portion 522 locating on a stub 524 extending axially from the planet gear housing 518*a*. The upper and lower impeller portions 515, 516, which are surrounded by outer shrouds 525, draw in air from opposite axial openings 526, 527 at top and bottom of the hub 505 and discharge it radially, in co-operation with partial volutes 528, 529, into the rotor blades 506, the shrouds 521, 525** helping to turn the flow towards the blades.

The gas turbine 503 draws in air through an annular intake 530 and discharges spent gas through the hollow arms **505*a* into the interior of the blades 506**. Thus the waste energy of the turbine adds to the total energy of the gases provided to the blades.

The impeller unit 514 when stationary offers little resistance to the flow of air into the blades 506, but to further reduce resistance the unit can be connected to the drive spindle 512 through a free wheeling device (not shown) so that the unit can rotate under the influence of air drawn into the blades 506 by the rotor-pump effect.

Figure 6A:
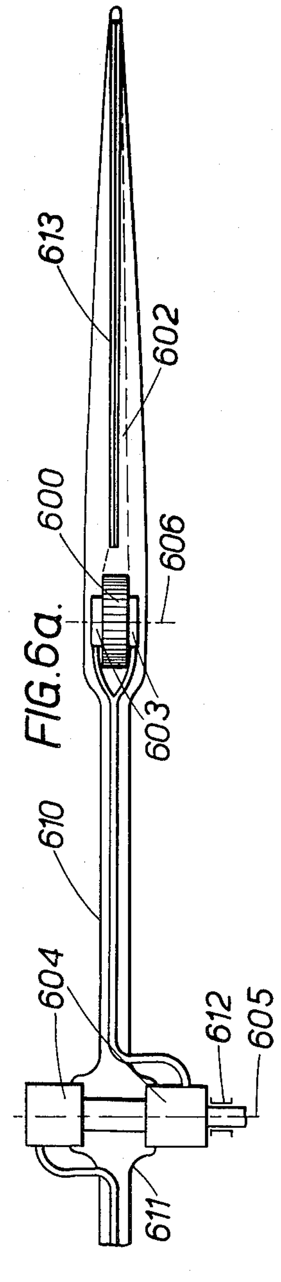
Figure 6B:
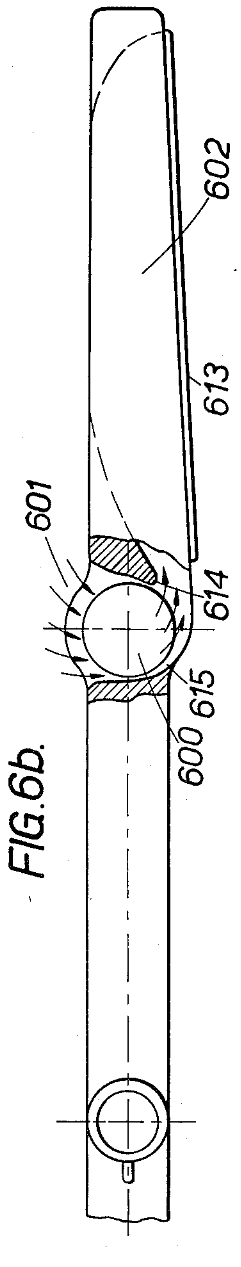

A further form of jet-producing means is illustrated in FIGURES 6*a* and 6*b*, which illustrate a rotor blade 610 mounted on a hub 611 which is supported for rotation about an axis 605 by a bearing 612 provided on the helicopter body, which is not shown. The rotor hub 611 carries an air compressor, e.g. a free-piston compressor 604 aligned on the axis 605 so that the piston will not be affected by coriolis forces. Compressed air is supplied by the compressor 604 to a pair of air motor 603 located on either side of an impeller 600 mounted for rotation about an axis 606 parallel to the axis 605 and intersecting the centre-line of the blade 610, whereby precession forces are avoided. The outer end portion of the blade 610 has a hollow interior 602 and a slot 613 along its rear edge communicating with the interior; the cross section of the outer end portion diminishes towards the blade tip as previously described.

The impeller 600, driven by the motors 603, takes air from an opening 601 at the leading edge of the blade and delivers it to the blade interior 602 whence it issues from the slot 613. A flap is provided as previous described, but is not shown.

The impeller 600 and adjacent guide surfaces 614, 615 forms a blower which we call "tangential". It is characteristics of a "tangential" blower that the impeller has blades which run longitudinally of the axis and are arranged in a ring thereabout, that the impeller is free of internal guides and substantially closed at its ends, and that the impeller and adjacent guide surfaces co-operate to set up a vortex which guides flow twice through the blades of the rotor in a curved path transverse to the rotor axis.

The latter feature is made use of in the present instance to take air from ahead of the blade and discharge it longitudinally outwardly along the blade: this is the natural form of flow in a "tangential" blower so that no deflectors are required (with consequent losses). It is a further characteristic of "tangential" blowers that they impose little resistance to flow therethrough when they are not operating, so that in the event of a power failure the helicopter can still be controlled as previously described.

It will be appreciated that alternative means of driving the impeller 600 can be provided.

Figure 7:
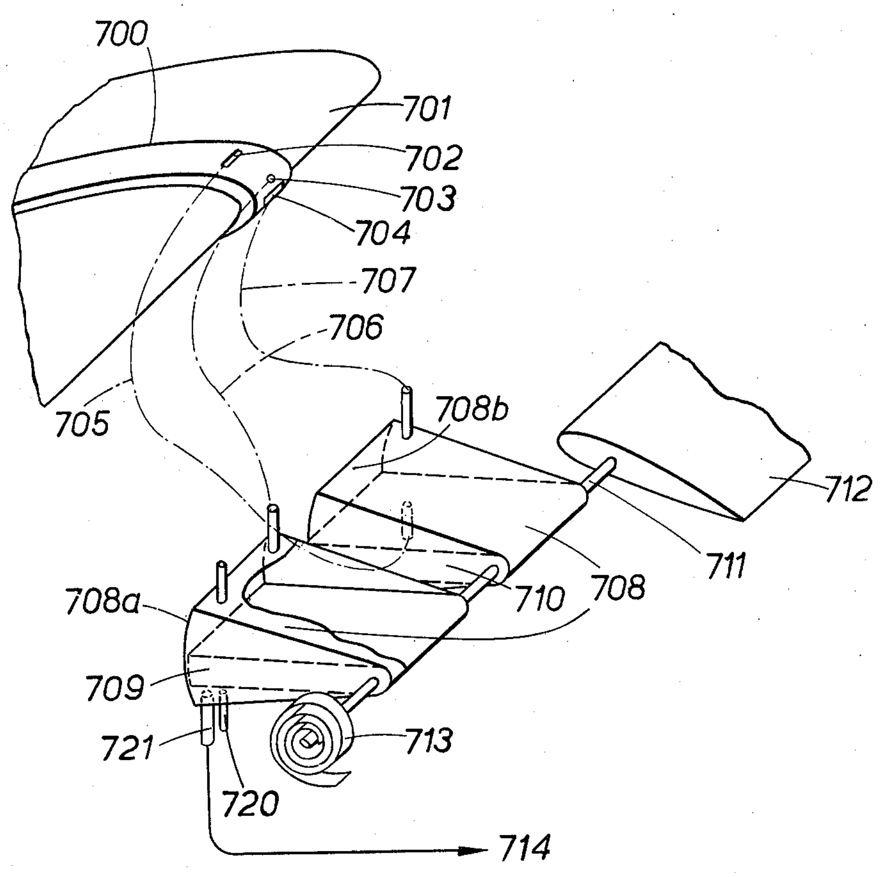
FIGURE 7 is a diagrammatic perspective view showing automatic control means for a flap of a rotor blade.

FIGURE 7 illustrates control means for the flap of a rotor blade, the flap and blade being shown in part at 712, 701 respectively, and being constructed as previously described. It will be appreciated that when the helicopter is in flight the lift coefficient of each blade must be reduced while the blade moves forwardly and increased while it moves rearwardly; in the preferred form of helicopter according to the invention this is done by an automatic cyclic adjustment of the angle of the flap superimposed on such movements of the flap as may be needed to control the helicopter in flight.

The flap 712 is rigid with a control spindle 711 having an axis coincident with the flap pivot axis: the spindle 711 is urged to a position of maximum lift coefficient by a coil spring 713 (alternatively a torsion bar could be used in place of the spring). The spindle 711 carries a pair of rectangular vanes 709, 710. These vanes are surrounded by casings **708*a*, 708*b*** respectively which are rectangular in plan and sector-shaped in elevation, the edges of each vane making smooth sliding contact with the interior of the respective casing and dividing it into an upper and lower chamber.

The blade 701 has an enlargement 700 wherein are formed three openings 702, 703, 704 at the leading edge of the blade, the opening 703 being on the median line of the blade cross-section and the other two being disposed at 45° to one another on opposite sides of the median line, the angle benig taken with reference to the centre of curvature of the leading edge profile. The openings 702, 703, 704 are connected respectively by conduits 705, 706, 707 to the lower chamber of casing **708*b*, the upper chamber of casing 708*a*, and the upper chamber of casing 708*b*, so that the vane 709, is subjected to the dynamic pressure at the median opening 703 urging the flap to the position of minimum lift coefficient and the vane 710 is subjected to the dynamic pressures at upper and lower openings 702, 704, one from either side. Two pipes 720, 721 communicate with the lower chamber of casing 708*a*, pipe 720 leading to a position in the blade where the rotor pump pressure will be effective to suck air through pipe 721, the lower chamber of casing 708*a* and the pipe 720. Thus the suction in the lower chamber of casing 708*a* is dependent on rotor pump pressure, it is also dependent on the degree of throttling associated with pipe 721, this pipe being connected by a pipe 714** to throttling means to be discussed in connection with FIGURE 12.

As so far described, the FIGURE 7 automatic control means operates as follows:

When the helicopter is in forward flight the dynamic pressure at all three openings 702, 703, 704 will rise as the blade moves forwardly and fall as the blade moves rearwardly, each pressure varying sinusoidally, in the ideal case, at the rate of one cycle per revolution of the rotor. In the ideal case the pressures at openings 702, 704 will cancel each other out in their effect on vane 710, while the pressure at opening 703, operating on the vane 709, will periodically move the flap 712 angularly, increasing pressure being effective to change the flap angle against resistance of the spring 713 whereby to diminsh the lift coefficient of the blade. Increasing rotor pump pressure, caused by increasing angular speed of the rotor, is effective also to reduce the lift coefficient: this variation will however not be a cyclic variation like the other.

The pressure acting on vane 710 superimposes correction values on the control effected by the vane 709 and takes account of differences of velocity in the vertical direction such as may occur due to meteorological changes and counteracts vertical vibrations of the rotor blades. By subdividing the flap along its length and providing control means such as shown in FIGURE 7 for each part it becomes possible to counteract vibrations of the blades such as would have one or more nodes along the length of the blade.

The angular movement of flap 712 under the influence of changing pressure at the opening 703 will be about linearly relates to that pressure, which will not always be desirable. FIGURES 8 to 11 show various ways of modifying the relation. In these figures the flap is shown only diagrammatically while details of blade and slot are omitted altogether.

Figures 8, 9, 10, 11:
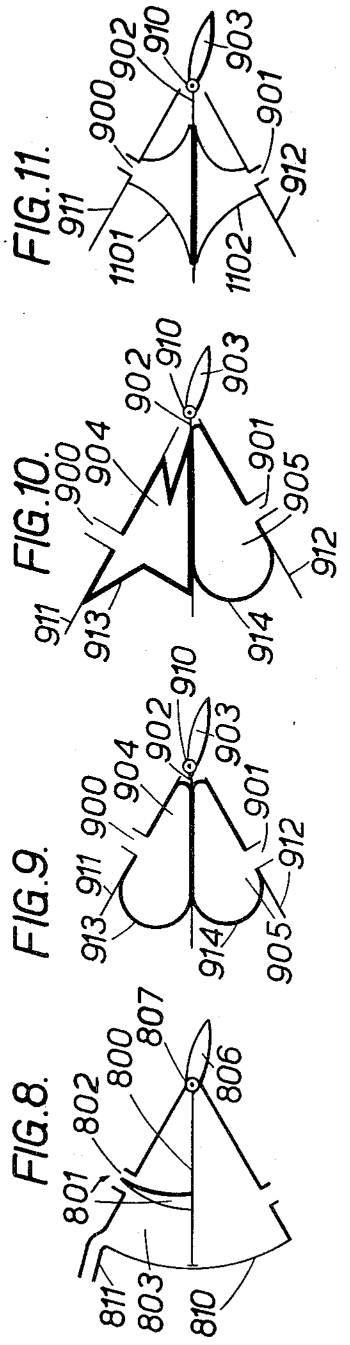
FIGURES 8 to 11 are diagrams showing four different ways of modifying part of the control means of FIG. 7.

FIGURE 8 shows a flap 806 controlled by a vane 800 mounted within a casing 810 in the same way as vanes 709 or 710 in casings **708*a* or 708*b*, the vane and flap being rigid with one another and both pivoting on the axis 807. An inlet 802 to the chamber 803 above the vane 800 is connected to a pressure source. An arcuate projection 801 increasing steadily in cross-section going from tip to root is secured to the vane 800 so as to block the inlet 802 to an increasing degree as the vane pivots upward beyond a central position. A bleed 811 to atmosphere allows pressure in the chamber 802 to fall to a value which is less than inlet pressure by an amount representative of the throttling produced by the projection 801**.

FIGURE 9 shows another arrangement of vane 902 controlling a flap 903, the vane being rigid with the flap and both pivoting about the axis 910. Here the vane can move between fixed walls 911, 912 disposed at an angle to one another like upper and lower walls of the casing 810 and having inlets 900, 901 respectively, and upper and lower chambers 904, 905 are formed by rubber sacs 913, 914 squeezed between the walls 911, 912 and upper and lower sides of the vane. Excess pressure, for example, in chamber 904 causes the vane 902 to pivot downwardly and thus the sac 913 lies against it with more area, while the sac 914 has a smaller area against the vane. As in the FIGURE 8 arrangement the relationship between differential pressure in the two chambers and the angular movement of the vane will be non-linear.

The FIGURE 10 arrangement resembles that of FIGURE 9, and similar parts are given the same reference numerals as used in that figure; the sole difference is that the walls of the sac 913 which do not lie against wall 911 or vane 902 are pleated, so that as the vane 902 pivots there is no change in the area thereof upon which pressure in chamber 904 is applied.

FIGURE 11 shows an arrangement similar to FIGURE 9 but arranged for operation by pressure below atmospheric. Parts of the FIGURE 11 arrangement which correspond to those of FIGURE 9 are given the same numerals. The rubber sacs here designated 1101, 1102 are reversed as compared with those of FIGURE 9 to stand the different directions of pressure. Once again, however, as the vane 902 moves from its central position different areas thereof will be subjected to pressure.

Figure 12:
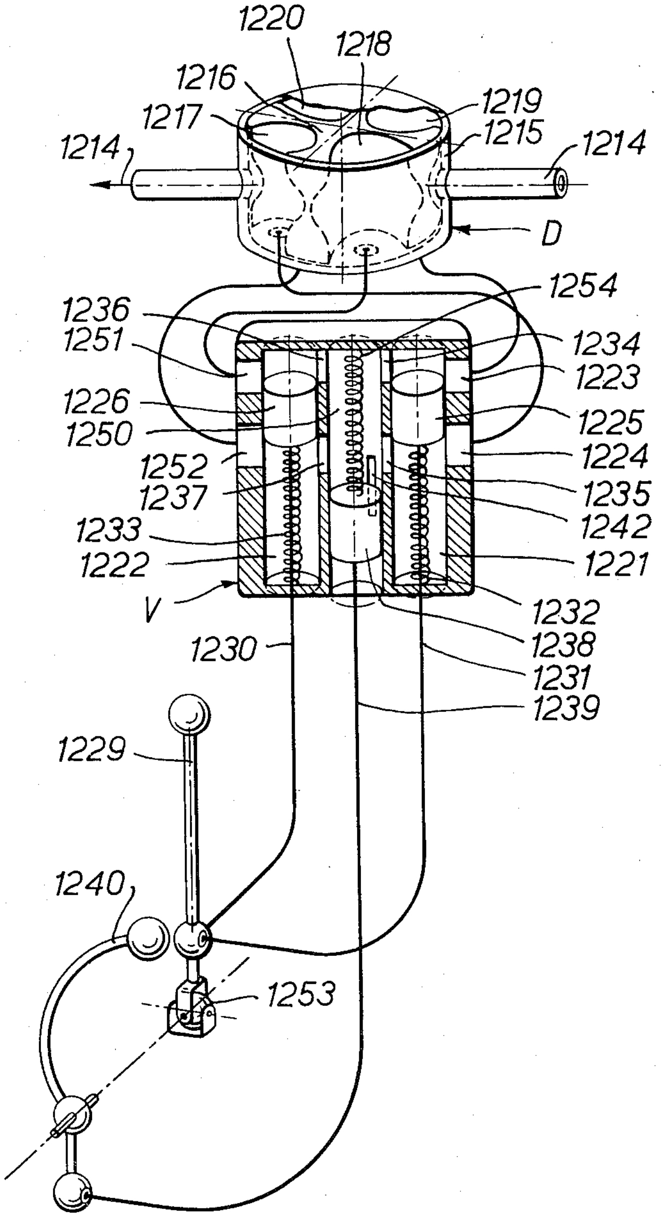
FIGURE 12 is a diagrammatic perspective view of a manual control device for the cyclic and collective adjustment of the flaps of the rotor blades.

FIGURE 12 shows a manual control device for the cyclic and collective adjustment of the lift coefficient of the blades, the device being adapted to co-operate with the FIGURE 7 automatic control means described above. The device operates by adjustment of the throttling of an air supply to the lower chamber of the casing **708*a* associated with each rotor blade: in this connection it will be recalled that suction dependent on the rotor pump pressure is applied to each such chamber through pipe 720, so that the suction will be reduced if air is supplied freely through the pipe 721 and the flap 712** will move accordingly.

The FIGURE 12 device consists principally of a distributor D, a throttle valve assembly V and manually operated lever mechanisms 1229, 1240 controlling the latter for vertical and horizontal flight.

The distributor D comprises a cylindrical casing 1215 rotating coaxially with the rotor hub (not shown) and closed at one end. The previously mentioned pipes 714, one for each blade, radiate from the cylindrical wall of the casing 1215 (two pipes only being shown) and provide communication between the interior of the casing 1215 and the lower chamber of the corresponding casing **708*a* of the FIGURE 7 flap control means. The distributor D further includes a central non-rotating block 1216 which fits snugly within and closes the bottom of the casing 1215: the block 1216 is formed with four similar outward-facing cavities 1217, 1218, 1219, 1220** which, as the casing rotates, each come periodically opposite the pipes 1214: each cavity extends over an arc of just under a right angle.

The throttle valve assembly V includes a block formed with three similar parallel bores 1221, 1222 and 1250 each closed at either end and containing a piston 1225, 1226 and 1238.

A slot 1242 extends from the exterior of the block to the central bore 1250 and the piston 1238 controls the cross-section of the slot which is available for flow into the upper chamber defined in the bore 1250 by the piston. Pairs of opposed ports 1223, 1234 and 1224, 1235 are formed in the block in association with right hand bore 1221; conduits connect the ports 1223, 1224 with one pair of opposite cavities 1219 and 1217 in the distributor block 1216 while the ports 1234 and 1235 lead out from the central bore 1250. The length of the piston 1225 is such that in a central position it blocks equally both the passage to the cavity 1219 from the central bore 1250 through ports 1234 and 1223 and the part of bore 1221 above the piston 1225, and the passage to the cavity 1217 from the central bore 1250 through ports 1235 and 1224 and the part of the bore 1221 below piston 1225. Pairs of opposed ports 1251, 1236 and 1252, 1237 are formed in the block in association with the left hand bore 1222; conduits connect ports 1251, 1252 with opposite cavities 1218, 1220 in the distributor block 1216, while ports 1236, 1237 lead out from the central bore. The piston 1226 and ports 1251, 1236, 1252, 1237 in the left hand bore 1222 are repsectively symmetrical about the axis of bore 1250 with the piston 1225 and ports 1223, 1234, 1224, 1235 in the right hand bore 1221.

Piston 1238 is urged by a spring 1254 against the pull of a Bowden cable 1239 connected to the control lever 1240. Pistons 1225, 1226 are also urged by springs 1232, 1233 respectively, against the pull of Bowden cables 1231, 1230 connected mutually at right angles to control lever 1229, which is universally mounted as shown at 1253.

It will be appreciated from the foregoing discussion of FIGURES 7 and 12 that the flap 712 on any given rotor blade pivots down (i.e. to increase lift coefficient) as the pressure in the lower chamber of the corresponding casing 708*a* decreases. For a given rotor pump pressure this decrease occurs on throttling communication between that chamber and the atmosphere. Movement of piston 1238 over slot 1242 throttles communication to the pipes 714 of all blades and provides a collective control of lift coefficient adjustable by lever 1240. Upward movement of piston 1225 from its central position increases the throttling associated with cavity 1219 (i.e. reduces the cross-section of the passage available for flow of air towards the cavity), and reduces the throttling associated with cavity 1217. Thus each pipe 714 as it comes opposite cavity 1219 is associated with increased throttling, and, as it comes opposite cavity 1217, with reduced throttling. Similar considerations apply to piston 1226 and cavities 1218 and 1220. Pistons 1225, 1226 are both adjustable by the lever 1229 which provides a cyclic control of lift coefficient.

The distributor D and valve assembly V are compact and the former can readily be accommodated in the rotor hub.

Figure 13:
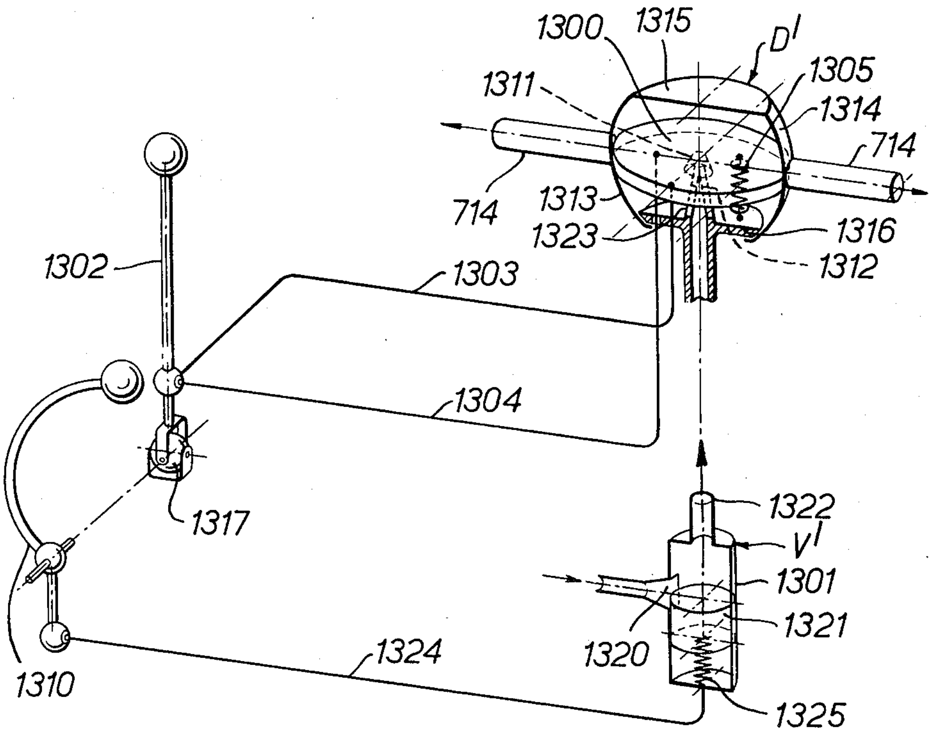
FIGURE 13 is a diagrammatic perspective view of a further control device for the same purpose as that of the device of FIGURE 12.

FIGURE 13 shows apparatus which performs the same function of collective and cyclic adjustment of the lift coefficient of the rotor blades as the apparatus of FIGURE 12, but by different means. Once again the apparatus is intended to co-operate with that of FIGURE 7 and FIGURE 13 shows the pipes 714 associated with two rotor blades. The apparatus again comprises a distributor here designated D′, a valve assembly V′ and manual control levers 1302, 1310.

The distributor D′ includes a thick circular swash plate 1300 mounted at 1311 for limited universal angular movement upon a central hollow stationary post 1312 coaxial with the rotor hub. The wash plate 1300 is enclosed by and fits snugly within a housing 1313 having a part-spherical wall 1314, the centre of the sphere coinciding with that of the swash plate. The housing 1313 includes an integral top 1315, and has its bottom closed by a wall 1316 fixed to the post 1312 and fitting snugly with the wall 1314 of the housing. The housing 1313 forms part of the rotor assembly and rotates therewith; the pipes 714 open into the housing with their axes on a horizontal plane containing the centre of the sphere. It will be seen that the swash plate 1300 makes sliding sealing contact with the housing wall 1314 as the latter rotates, and this sealing is unaffected by angular movement of the plate on its mounting 1311.

Bowden cables 1303, 1304 passing through the wall 1316 are connected to the plate 1300 at two points near its periphery, the points subtending 90° at the centre of the plate. The Bowden cables 1303, 1304 are connected to the control lever 1302 which is universally mounted at 1317, the connections of the cables being mutually at right angles; movement of the control lever 1302 thus produces a similar movement in the swash plate 1300 by means of the cables 1303, 1304 acting thereon by tension against the biassing spring 1305. The plate 1300 partially blocks the pipes 714 where they enter the housing 1313 and movement of the plate varies the degree of throttling of a pipe of a pipe 714 at a given angular position: at any setting of the plate other than horizontal the throttling of the pipes 714 will vary cyclically as they revolve.

The valve assembly V′ comprises a cylinder 1301 having a slit 1320 in its side communicating with the atmosphere, and a piston 1321 controlling the air passage area through this slit 1320. A conduit 1322 leads from the cylinder 1301 to the hollow post 1312 of the distributor D′ and thence to the interior of the housing 1313 through ports 1323. A Bowden cable 1324 connects piston 1321 to the control lever 1310, the cable acting by tension against a spring 1325 biassing the piston.

From the foregoing it will be seen that the lever 1310 controls throttling to all pipes 714 and thereby similarly affects the flaps 712 on all blades, while lever 1302 provides through the swash pate 1300 a cyclic variation of throttling of pipes 714.

Figures 14, 16, 17:
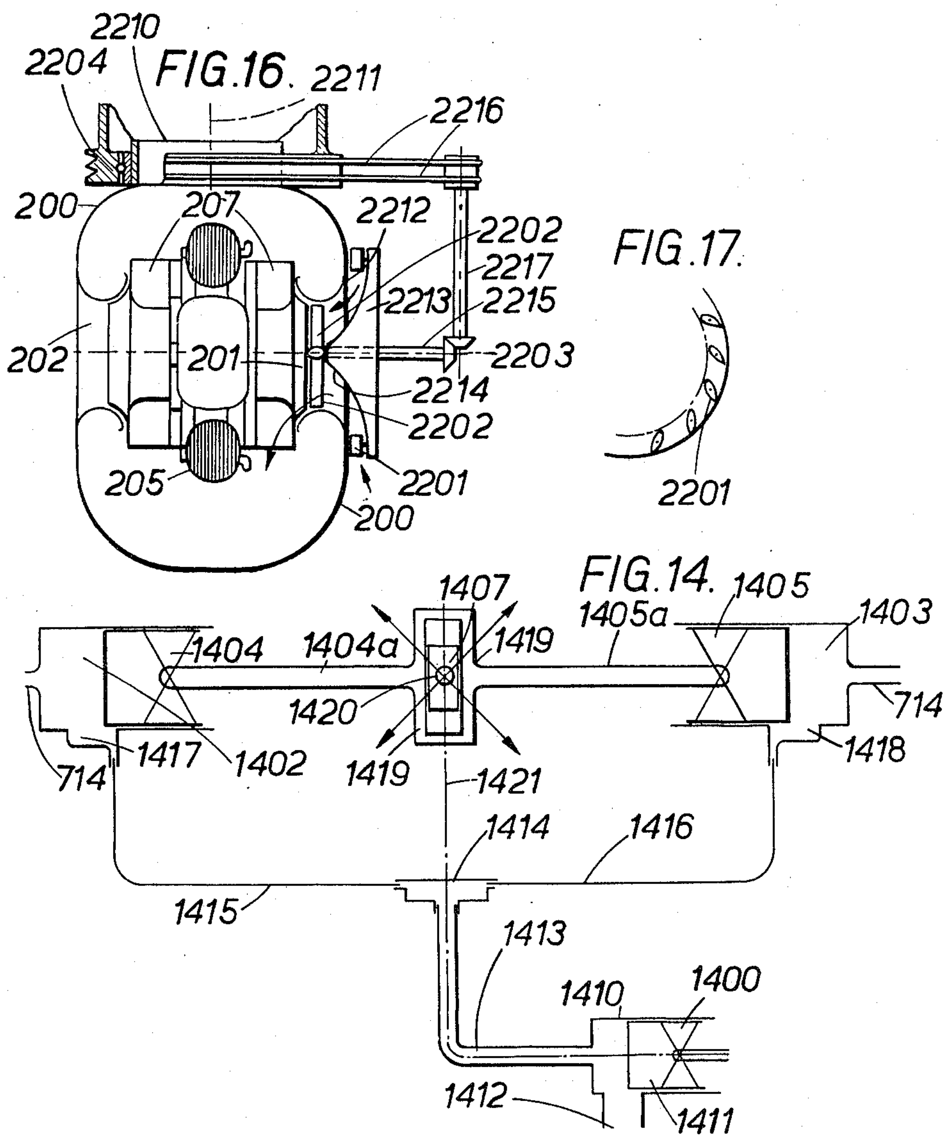
FIGURE 14 is a diagram of yet another control device for the same purpose as that of the device of FIGURE 12.
FIGURES 16, 18 and 19 are diagrammatic sections containing the rotor axis and illustrating three different methods of imposing a torque thereabout.
FIGURE 17 is a partial view showing control vanes forming part of FIGURE 22*a*.

Another form of apparatus alternative to that of FIGURE 12 is shown in FIGURE 14: once again this apparatus performs cyclic and collective adjustment of the lift coefficient of the blades and co-operates with the apparatus of FIGURE 7, the pipes 714 associated with two opposed rotor blades being shown.

The FIGURE 14 apparatus comprises collective throttle means 1400 similar in principle to the piston and cylinder arrangement 1250, 1238 of FIGURE 12 or 1301 and 1321 of FIGURE 13; the throttle means include a cylinder 1410 and a piston 1411 movable therein to control the area of the port 1412 available for air flow from the atmosphere into a conduit 1413. The conduit 1413, which is fixed, leads to a distributor arrangement shown generally at 1414 to which are connected pipes corresponding to and rotating with the rotor blades: two such pipes 1415, 1416 are shown, one for each pipe 714 above mentioned. Each pipe 1415, 1416, leads to a port 1417, 1418 in a cylinder 1402, 1403 the area of each port available for flow being controlled by a piston 1404, 1405 in the respective cylinder, and each cylinder being connected to the respective pipe 714. The pistons 1404, 1405 are connected by rigid piston rods 1404*a*, 1405*a* to a central cross-guide 1419 wherein is slidable a guide block 1407 rotatable on a pin 1420. Piston rods 1404*a*, 1405*a* and cross-guide 1419 forms a rigid structure and when the pin is located on the rotor axis indicated at 1421 this structure rotates without oscillation; thus the position of the pistons 1404, 1405, in the cylinders 1402, 1403 remains constant and thereby the degree of throttling to each pipe 714 also remains constant. The pin 1420 can be moved in two directions at right angles as indicated by the arrows, under manual control, e.g., by a lever such as the lever 1229 of FIGURE 12. If for example the pin 1420 is moved leftwards, the throttling associated with the blades as they pass to the left of the longitudinal axis (as illustrated) increases, while the blades at the right have their throttling reduced. Movement of the pin 1420 thus enables cyclic adjustment of the lift coefficient of the blades, while the piston 1411 provides for collective adjustment, also under manual control (not shown).

It will be appreciated that FIGURE 7 in combination with any of FIGURES 12, 13 or 14 provides (a) an automatic adjustment of flap angle (and hence, as explained, of lift coefficient) to take account of the varying speed of the blade through the air in the course of its rotation, when the helicopter is moving horizontally, (b) a collective adjustment of flap angle, under manual control, for regulating vertical flight, and (c) a cyclic adjustment of flap angle, also under manual control, to determine the direction and speed of horizontal flight.

Figure 15:
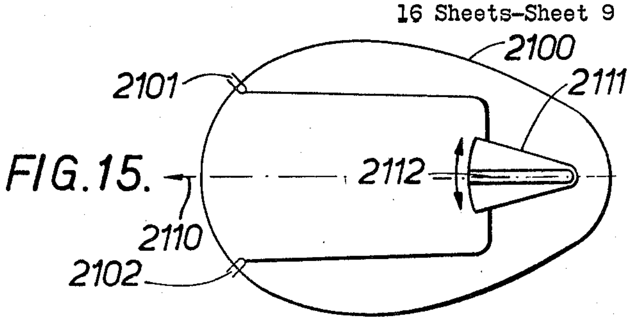
FIGURE 15 is a diagrammatic section of a helicopter fuselage showing means for controlling it about a vertical axis.

FIGURE 15 shows a fuselage 2100 having a pair of openings 2101, 2102 symmetrically arranged with respect to the fuselarge axis and facing forwards at an angle of substantially 45° to the direction of forward movement as indicated by the arrow 2110. The openings 2101, 2102 are connected to a sector-shaped housing 2111 on either side of a vane 2112 therein, which is pivotally mounted and divides the interior of the housing into two chambers. The vane is arranged to control any suitable means of applying a torque to the fuselage about the vertical axis; thus it can be used to regulate the control systems described below with reference to FIGURES 16 to 18. It will be seen that if, say, the fuselage 2100 turns to port the opening 2101 approaches the direction of movement and the dynamic pressure thereat increases. Conversely, the pressure at opening 2102 decreases. Thus the vane 2112 will pivot downwards as viewed in FIGURE 15 and cause a torque to be applied to the fuselage in a starboard direction. Damping means is preferably included to minimize oscillation.

FIGURES 16 to 21 are concerned with means for generating a torque about the rotor axis between the rotor and the fuselage whereby to control the angular position of the fuselage about that axis.

FIGURE 16 shows an engine and blower combination as illustrated in FIGURES 2*a* and 2*b*, in combination with a rotor hub 2204 mounted for rotation on a bearing 2210 about a vertical axis 2211. The main reference numerals used in FIGURES 2*a* and 2*b* are gain used in FIGURE 16, and the parts indicated will not need further description.

Figure 20:
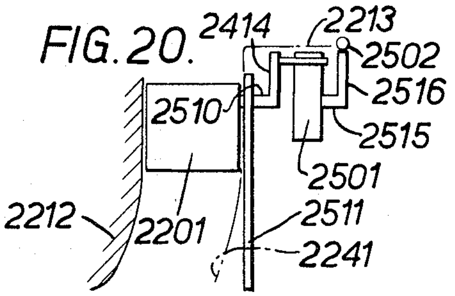
FIGURES 20 and 21 are respectively a diagrammatic sectional view and a perspective view showing means for supporting and controlling the vanes of FIGURES 16 and 17.
Figure 21:
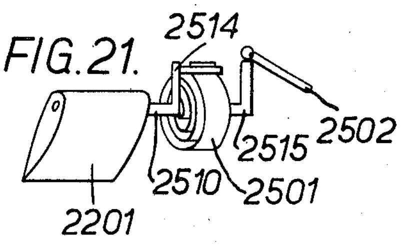

It will be recalled that air enters intake openings 201, 202, which are disposed to either side of the median vertical plane. Air flowing into opening 201 is guided between the convex annular outer surface 2212 of the volute 200 and baffle member 2213 which provides a guide surface 2214 in the form of a surface of revolution coaxial with the blower. A series of guide vanes 2201 (see also FIGURE 17) are arranged in a ring in the annular entry between the surfaces 2212 and 2214 and are supported on the baffle member 2213. Means not shown provide a common control for the setting of the guide vanes 2201. (FIGURES 20 and 21 show one way in which the vanes 2201 can be mounted and controlled.) An axial-flow impeller 2202 mounted on a shaft 2215 coaxial with the blower is arranged within the intake 201 close to the corresponding impeller 207; the shaft is rotated by the rotor hub 2204 via V-belt 2216, an intermediate shaft 2217 and bevel-gear transmission 2203, the transmission ratio being such that when the vanes 2201 are set to their neutral position (i.e. so as to cause no twist of incoming air) no torque is applied between the rotor 2204 and the impeller 2202.

When the setting of the vanes 2201 is changed from the neutral position by for example the vane of FIG. 15, the vanes 2201 impose a twist on the incoming air and a torque is set up about the axis 2211, its direction depending on the direction in which the vanes are angularly moved from their neutral position.

The apparatus of FIGURES 16 and 17 can be combined with that of FIGURE 21 as previously mentioned; in this case movement of the vane 2112 controls the setting of vanes 2201; such a combination permits the usual tail rotor or vertical control surface to be dispensed with.

When the engine ceases to operate, the speed of rotation of the rotor hub 2204 drops and so does the rate of air flow through the intake 201. Thus for control under auto-rotation conditions, the guide vanes 2201 need to be set to a greater angle; an interval should be allowed on changeover between driven-rotor and auto-rotation conditions before operating automatically with the changed vane angles.

Figure 18:
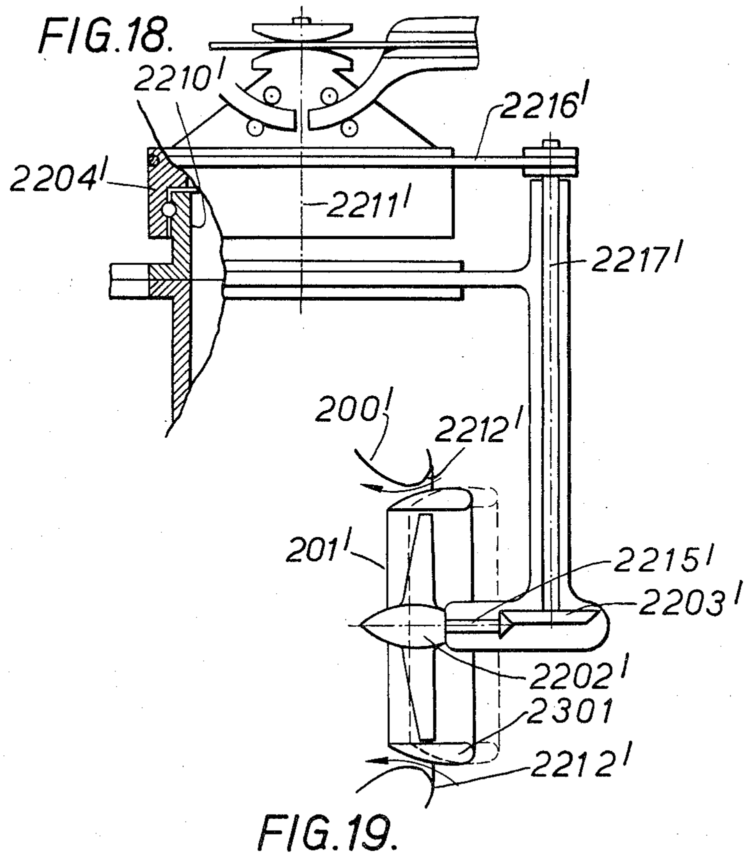
Figure 22:
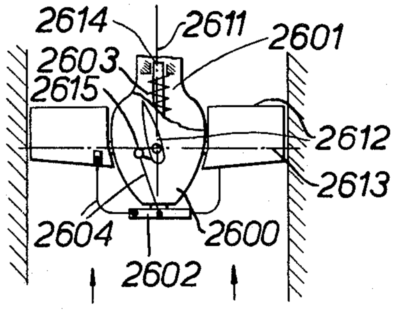
FIGURES 22 and 23 are axial sections of impellers such as may form part of the FIGURE 19 construction.

FIGURE 18 shows a further system for producing torque about a vertical axis; parts which are similar in principle to those of FIGURE 22 are designated by the same numerals distinguished by a prime and their functioning will be sufficiently understood from the foregoing description. In the system of FIGURE 18, control by the guide vanes 2201 of FIGURE 16 is replaced by control derived from an axial movement of the impeller 2202' and shroud 2301 together in and out of the intake opening 2201', the baffle member 2213 of FIGURE 22 being dispensed with. Unlike the impeller 2202 of FIGURE 22, the impeller 2202' of FIGURE 18 is surrounded by an annular shroud 2301. Axial movement of the impeller 2202' and shroud 2301 together varies the proportions between the amount of the intake air which passes between the surface 2212' of the volute 200' and the outer surface of the shroud, and the amount of the intake air that passes through the impeller. The arrangement is such that under normal conditions in a given axial position of the impeller 2202' and shroud 2301 (the neutral position) no torque is transmitted between the rotor hub 2204' and the impeller. Axial displacement of the impeller 2202' from the neutral position, by varying the amount of air acting on the impeller, sets up a torque, the direction of the torque depending on the direction of the displacement. The impeller 2202' and shroud 2301 can be regulated by automatic means, such as that of FIGURE 15, or by manual control means. Once again, as with the FIGURE 22 system a changeover between driven-rotor and auto-rotation conditions necessitates an adjustment, here a displacement of the impeller 2202' and shroud 2301, and again an interval should elapse after changeover before subjecting the system to automatic control with the adjusted neutral position.

Figure 19:
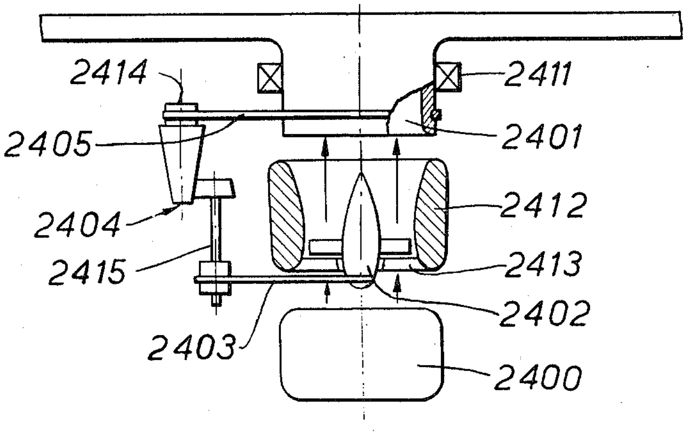

FIGURE 19 illustrates a torque-producing control system which achieves the same object as the systems of FIGURES 16 and 18, but by acting upon the air delivered by the blower instead of upon the intake air thereof.

In the FIGURE 19 system, the rotor is indicated at 2401, and is supported for rotation in a bearing 2411. An engine driven blower 2400 delivers air axially upwards to the rotor hub, through an axially disposed shroud 2412 and an impeller 2402 mounted therein for rotation on a spider 2413. The rotor 2401 and impeller 2402 are each connected to intermediate shafts 2414, 2415 respectively by belts 2405, 2403 and these shafts are interconnected by a continuously variable speed-change transmission 2404, illustrated as being of the interengaging cone type.

In a neutral setting of the speed-change transmission under normal conditions no torque is transmitted between the rotor 2401 and impeller 2402, but if the setting is altered, torque in one direction or the other will be set up. Automatic and/or manual control of the gear 2404 can be provided; again, under auto-rotation conditions different gear setting will be needed.

FIGURES 20 and 21 show mechanism by which the blades 2202 of FIGURE 22 can be mounted and controlled: only one blade is shown and while in FIGURE 20 the surfaces 2212 and 2214 are partially indicated, they are omitted in FIGURE 21. The illustrated blade 2201 is secured upon a mounting spindle 2510 journalled in a carrier plate 2511 forming part of the baffle member 2213 of FIGURE 16 and, with the rest of the mechanism, enclosed by the exterior surfaces of that member. A crank 2414 on the end of the spindle 2510 within the member 2213 is connected to the outer end of a spiral spring 2501, the inner end of the spring being secured to a control spindle 2515 coaxial with the spindle 2510 and having a crank 2516 articulated to a control rod 2502.

The spindle 2510 carries the blade 2201 near its leading edge and ahead of the center of pressure thereon, and the spring 2501 is arranged to urge the blade to a maximum setting angle (i.e. such as to impose a large twist on the incoming air). Thus when the air velocity past the blades is high, the air will pivot the blades to a smaller angle against the force of the spring 2501, and when the air velocity drops, the blades will adopt a larger angle. The arrangement shown is, therefore, able to respond automatically to the changeover between engine-driven rotor conditions and those of auto-rotation.

Figure 23:
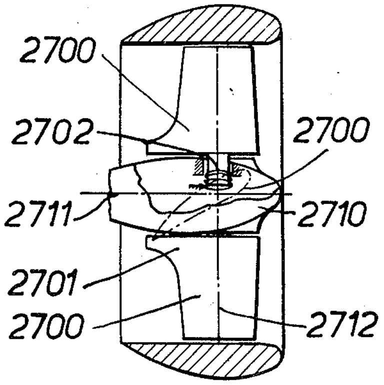

FIGURES 22 and 23 show two ways of mounting the blades of an axial impeller whereby to produce for the FIGURE 19 control system the same results as can be achieved by mounting the FIGURE 16 guide vanes as shown in FIGURES 20 and 21.

The impeller shown in FIGURE 22 has a hub 2600 mounted for rotation about the axis 2611. Four blades 2612 are mounted on the hub so as to be capable of angular movement about radial axes; two such axes are shown the line 2613. A disc 2602 is mounted on the upstream side of the hub 2600 on a rod 2614 slidable axially in the hub and urged rearwardly by a spring 2603. Control rods 2604 connect the disc 2602 to cranks 2615 on the blades 2612, so that when the flow past the impeller is rapid, and the dynamic pressure on the plate 2602 correspondingly great, the blades 2612 are turned to reduce their angle to the flow. The spring 2603 and the area of the disc 2602 are preferably so chosen that under normal conditions with the speed-change transmission 2404 in its mean position there is no transfer of torque about the upright rotor axis between rotor and impeller.

FIGURE 23 shows an impeller having a hub 2710 rotatable about an axis 2711 and mounting blades 2700 for angular movement about radial axes of which two are shown by the line 2712, the axis 2712 for each blade lying forwardly (i.e. upstream) of the center of pressure on the blade; preferably each blade has a readward extension 2701 close to the hub. A spiral spring 2702 urges each blade towards a maximum pitch setting; the faster the flow the greater the pressure on the blade and the further it is urged thereby against the action of the spring 2702 to reduce its angle to flow. The impeller is designed so that, when used in the control system of FIG. 19, no torque is transmitted between rotor and impeller under normal conditions when the transmission 2404 is in its mean position.

Figure 24:
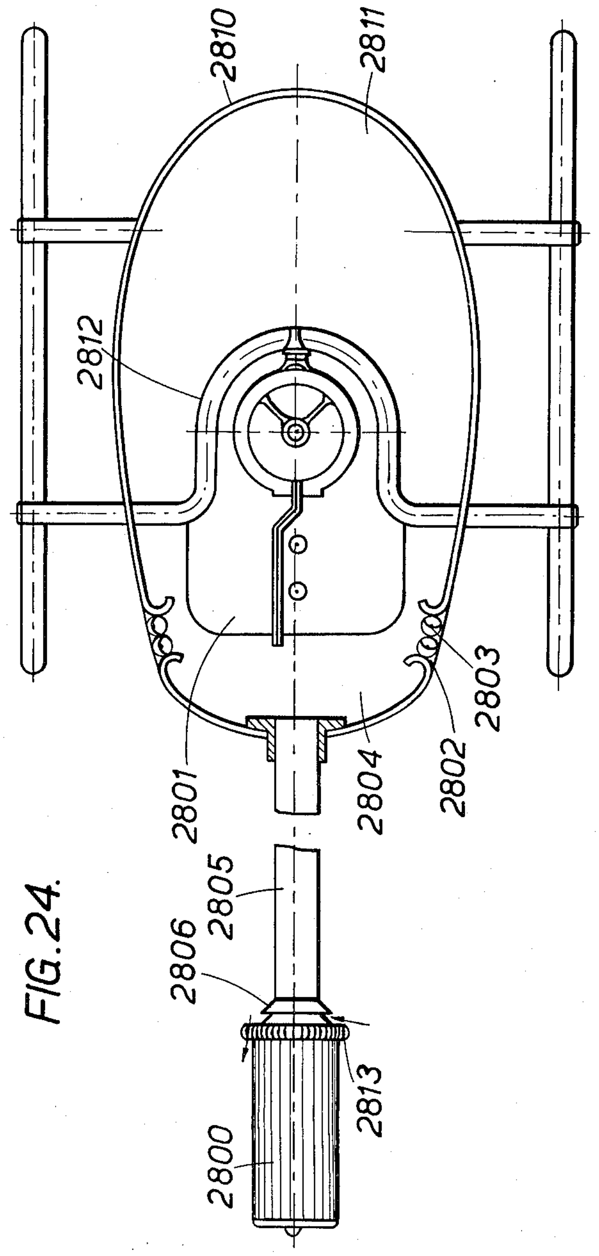
FIGURE 24 is a diagrammatic horizontal section showing the helicopter with a tail unit.
Figures 25, 26:
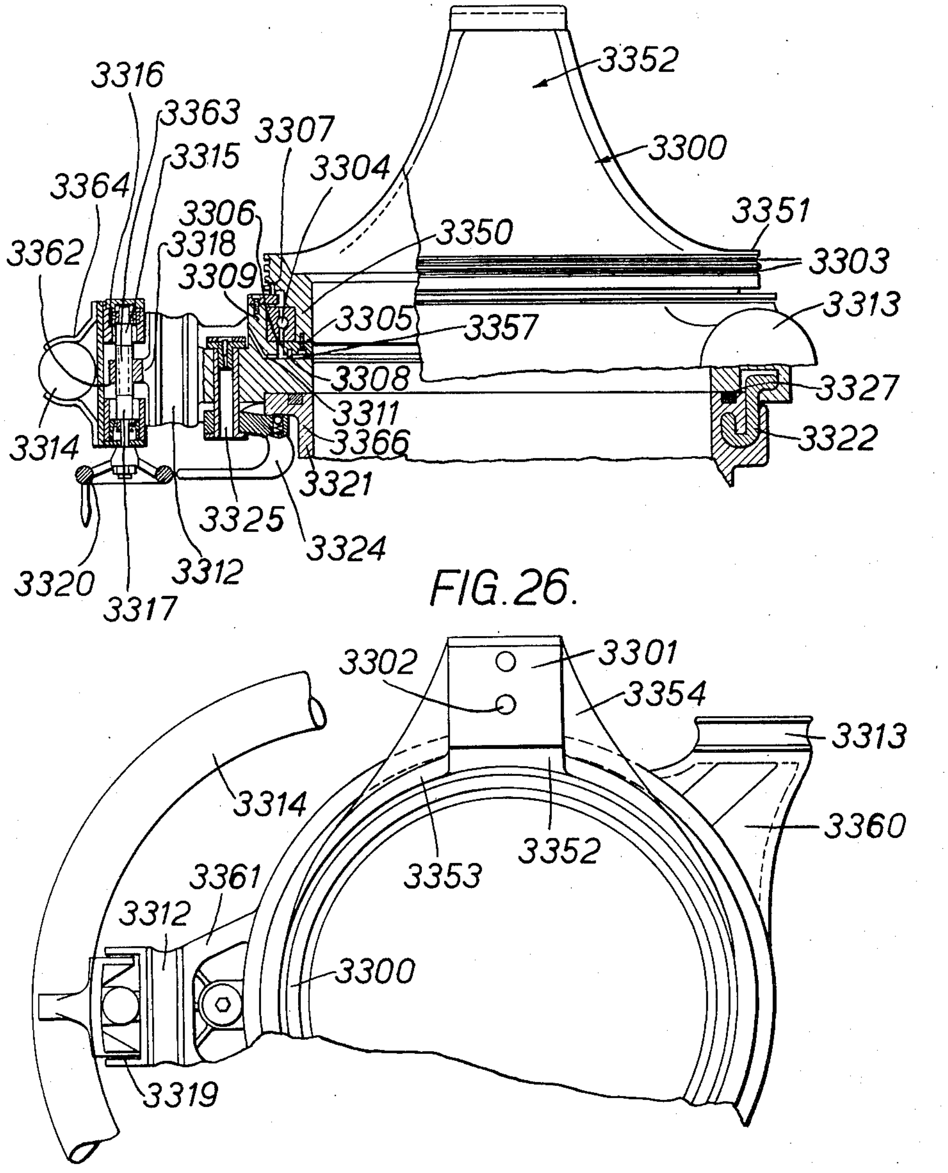
FIGURE 25 is a side elevation of a rotor hub and support means therefor, with parts shown in axial section and parts broken away.
FIGURE 26 is a plan view of the FIGURE 25 assembly showing parts broken away.
Figure 27:
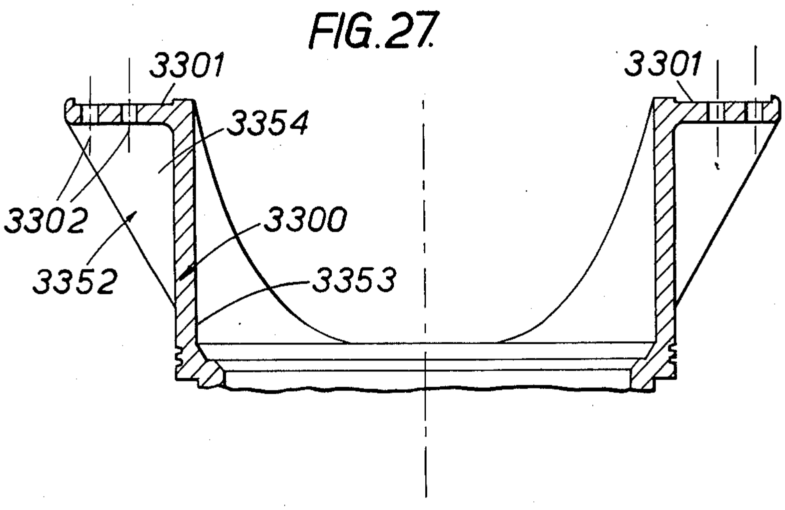
FIGURE 27 is an axial section of the upper portion of the hub.

By means of the apparatus of FIGURES 15 to 23 helicopters can be designed according to the invention to operate without tail rotors or vertical control surfaces; FIGURE 24 shows an advantageous form of tail unit which can be used in place of the apparatus of those figures.

The fuselage 2810 of FIGURE 24 is divided by a transverse bulkhead 2812 into a forward passenger compartment 2811 and a rear compartment 2804 containing the motor and blower unit 2801, and a tubular tail member 2805 extends rearwardly from the cabin with its interior in communication with the motor compartment. The unit 2801 takes its air from the compartment 2804. Towards the rear of each side of the cabin an opening 2802 leads into the motor compartment 2804, each opening being controllable by paired butterfly valves 2803. The rear end of the tail member 2805 carries two turbine blade rings 2813 and 2806 and impeller 2800 all coupled for rotation together about the axis of the member 2805. Blade ring 2813 is acted upon by the air when the helicopter is in forward horizontal flight, and rotates the impeller 2800. When the helicopter is in vertical flight the valves 2803 are partially or completely closed and the air for the motor-blower unit 2801 is taken in through the blade rings 2806, with the result that once again the impeller rotates. The impeller 2800, which is of the cross-flow type, takes air from one side and discharges it to the other, thereby producing by reaction a torque on the cabin opposing that produced by operation of the rotor.

Since in horizontal flight air for the motor-blower unit 2801 is taken from the compartment 2804, air is continuously sucked through the openings 2802; these are so placed that thereby the boundary layer of air flowing over the sides of the cabin 2810 is removed where otherwise it would tend to break away, with attendant drag.

FIGURES 25 to 30 show a preferred means of mounting a rotor hub 3300 to a fuselage here represented simply as a mounting ring 3314, provision being made for spring-mounting a pair of blades (not shown) on the hub as later explained with reference to FIGURE 32 and for introducing air from a blower unit through the hub into the blades.

The rotor hub designated generally 3300 is a casting presenting a cylindrical body 3350, a flange 3351 at one end of the body, and a pair of spring bearers 3352 upstanding from the flanged end of the body on opposite sides thereof. The flange 3351 is exteriorly grooved for V-belts at 3303, and the spring bearers 3352 each provide a support wall 3353 with reinforcing webs 3354 carrying an exteriorly overhanging flat spring-mounting platform 3301 drilled with holes 3302 for fixing bolts.

Figure 28:
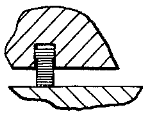
FIGURES 28, 29 and 30 are fragmental views showing sealing means for the rotor hub.
Figure 29:
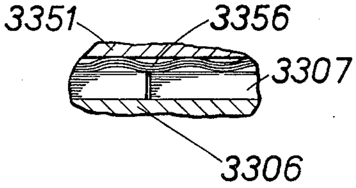
Figure 30:
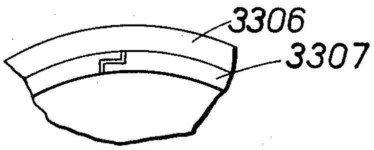

The hub body 3350 is mounted for rotation upon a support ring 3309 by means of a ball bearing 3304 whereof one race is secured on the hub body against a shoulder by a flat locating ring 3305 fixed thereto and the other is secured on the support ring against a shoulder by another flat locating ring 3306 attached to the support ring. The bearing 3304 is sealed against passage of air both on the inside and on the outside by sealing rings 3307, 3308 mounted in the hub 3300. FIGURES 28, 29 and 30 show how the ring 3307 is mounted. The underside of the hub flange 3351 is formed with a groove 3355 snugly receiving the sealing ring 3307 and also a corrugated resilient element 3356. The ring 3307 projects from the groove into contact with the upper face of the locating ring 3306 under resilient pressure due to compression of the element 3356. The ring 3308 is similarly mounted in a groove in the locating ring 3305 and makes contact under resilient pressure with a flat shoulder 3357 on the support ring 3309. The space between the sealing rings 3307 and 3308 is vented to atmosphere by the bleed passage 3311.

The support ring 3309 is connected to the mounting ring 3314 at three points, through two rubber blocks 3313 (one only being shown in FIGURE 26) and one block 3312, each of generally cylindrical form and secured to brackets 3360, 3361 on the support ring. Blocks 3313 are connected directly and non-adjustably to the ring 3314 while block 3312, being bonded to the bracket 3361 at one side, is bonded at the other to a vertical slideway 3318 having a projecting lug 3362 with a vertical tapped hole; the slideway 3318 receives a slide 3316 in which is journalled, in bushings 3315, 3317, a vertical spindle 3363 having a threaded part cooperating with the lug 3362 and an adjusting handle 3320. The slide 3316 carries clamp arms 3364 embracing the mounting ring 3314. It will be appreciated that by means of the handle 3320, spindle 3363 and lug 3362 the slide 3316 can be moved along the slideway 3318 to adjust the relation of the axis of the hub 3300 to the plane of the mounting ring, the blocks 3313 having adequate elasticity to accommodate the relatively modest range of adjustment which is provided.

The motor-blower unit 3321, of which only an upper cylindrical portion is shown, is suspended from the support ring 3309 in abutting relation thereto, and sealed thereto by a rubber ring 3327. The unit 3321 is carried at one side by a hook 3322 engaging in notches in the support ring and units at the opposite side a clamping lever 3324 is mounted underneath the bracket 3361 on a post 3325 and cooperates with a lug 3366. The motor-blower unit can thus readily be detached from the support ring 3309.

Figure 31:
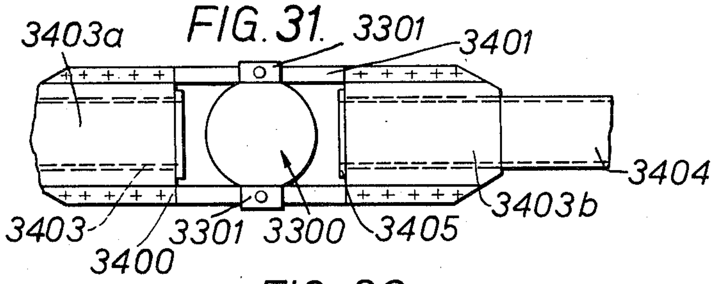
FIGURE 31 is a plan view of a rotor hub showing means for connecting it to rotor blades.

FIGURE 31 shows two sets of leaf springs 3400, 3401 secured to the mounting platforms 3301 of the rotor hub 3300, which is here shown only diagrammatically. The leaf springs 3400, 3401 run parallel and, on opposite sides of the hub 3300, mount a pair of sleeves **3403*a*, 3403*b* between them which in turn carry the roots of rotor blades 3404. The inner ends of the blades 3404 are flanged as shown at 3405 to prevent their being pulled out of the sleeves by centrifugal force. Flexible walls (not shown) connecting the hub 3300 and the blades 3404** provide for passage of air therebetween without leakage.

The FIGURE 31 arrangement requires no additional elements for preventing the blades 3404 from moving about their axes so as to change pitch provided the springs 3401, 3402 are far enough apart; on the other hand the assembly shown is large, which leads to appreciable drag. FIGURE 32 shows a modification of the assembly of FIGURE 31, which can be made more compact. Similar parts have similar reference numerals, and will need no further description.

Figure 32:
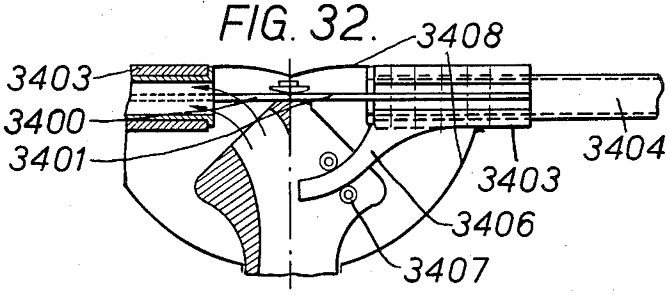
FIGURE 32 shows a modified form of rotor hub and blades supporting means, in elevation and partial section.

The sleeves 3403 shown in FIGURE 32 have projections 3406 engaging slidably between rollers 3407 mounted on the hub, whereby to prevent angular movement of the rotor blades 3404 about their axes. The flexible walls guiding air between the hub and the blades are shown at 3408.

Figure 33:
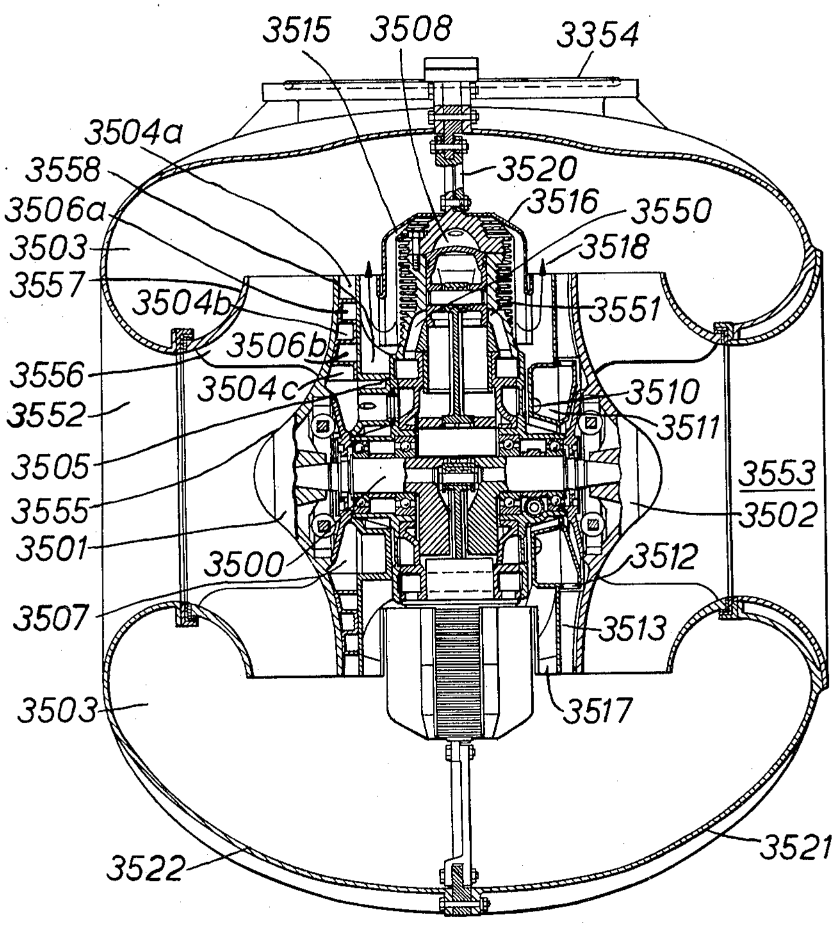
FIGURES 33 and 34 are respectively an axial section of a motor driven blower and a half elevation thereof, with parts shown broken away.
Figure 34:
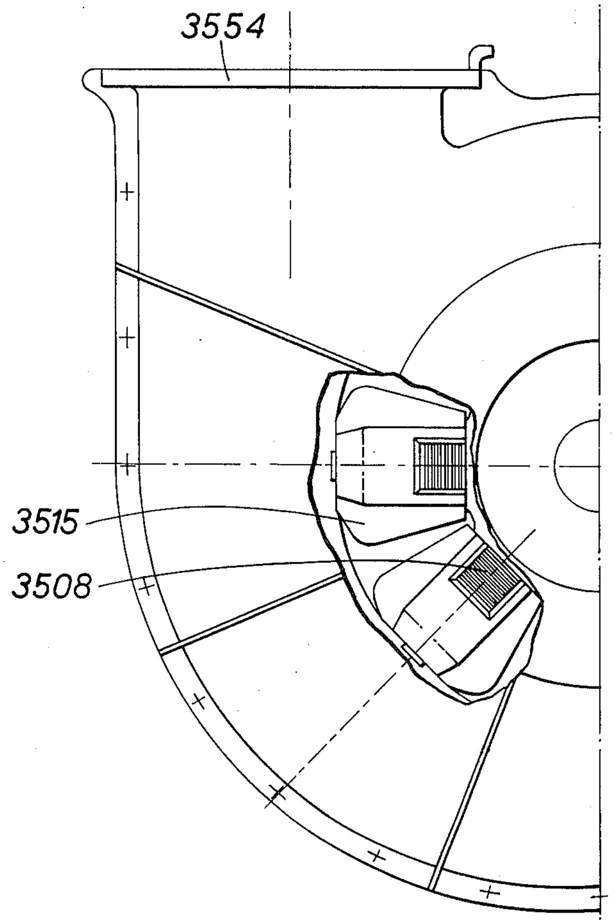

FIGURES 33 and 34 show a motor-blower combination for supplying air to the rotor blades of a helicopter according to the invention. The motor comprises eight cylinders 3508 arranged radially and working on the two-stroke system, with opposed inlet and exhaust ports 3550 and 3551 respectively opened and closed on movement of the piston. The motor crankshaft 3500 carries a pair of similar impellers designated generally 3501, 3502 on either side of the cylinders 3508 which rececive air from opposite axially disposed inlets 3552, 3553 and deliver it to a common volute 3503 having an exit 3554 and surrounding the cylinders as well as the impellers. The left-hand impeller 3501 comprises a back plate 3555 carrying impeller blades 3556 interconnected by a shroud plate 3557 opposite the back plate. The back plate 3555 mounts three rings of blades **3504*a*, 3504*b*, 3504*c* on the side thereof facing the motor, and these moving blades cooperate with guide vanes 3506*a*, 3506*b* fixed to an annular stationary support plate 3558 to provide a 3-stage inward-flow air compressor drawing air from the volute and delivering it to an annular receiver or pressure chamber 3507 whence it is led to the cylinder inlet ports 3550**.

Exhaust from the cylinder ports 3551 is led by pipes 3510 to an annular manifold 3511 and thence past guide vanes 3512 to an exhaust turbine 3513, the turbine being mounted for free rotation about the crankshaft 3500 and discharging radially outwardly into the volute 3503.

Each of the cylinders 3508 has its outer end shrouded by a pair of deflectors 3515, 3516; the exhaust gas turbine 3513 carries impeller blades 3517 which draw air past the cylinders 3508 from the space between them, guided by the deflectors 3515, 3516, and discharge it into the volute again, as indicated by the flow lines 3518. The exhaust heat, as well as that rejected to the cylinder walls and appearing in the cooling air, is added to the air supplied to the rotor of the helicopter.

The whole assembly of motor and impellers is supported from the volute 3503 by radial arms 3520 disposed in the plane of symmetry, and the volute is made in two parts 3521, 3522, which may be provided with acoustic insulation.

Control of the motor is achieved by adjustment of the guide vanes **3506*a*, 3506*b***, this adjustment varying the amount of supercharge.

What we claim is:

1. A helicopter comprising:

a fuselage;

a rotary airfoil journaled on said fuselage for rotation about a generally upright axis in a lift-generating sense while extending transversely to said axis, said rotary airfoil being hollow and provided with a trailing edge formed with an elongated slot communicating with the interior of said airfoil for discharging a rearward jet of a gaseous fluid for rotating said airfoil in said sense;

power means on said fuselage for compressing said gaseous fluid, said power means upon immobilization resisting air flow therethrough;

conduit means communicating between said power means and said interior of said airfoil for supplying said gaseous fluid to said airfoil for discharge through said slot during powered rotation of said airfoil; and control means including said conduit means for supplying a quantity of air to the interior of said airfoil for discharge through said slot upon autorotation of said airfoil during immobilization of said power means sufficient to permit said autorotation at a rate approximating the rate of rotation of said airfoil during powered rotation whereby said autorotation of said airfoil controls descent of said fuselage during immobilization of said power means, said control means including valve means communicating between the surrounding atmosphere and said conduit means and held normally closed by the pressure of said gaseous fluid in said conduit means for admitting said air to said conduit means upon immobilization of said power means.

2. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an outlet communicating with the interior of said airfoil for discharging a rearward jet of a gaseous fluid for rotating said airfoil in said sense;

conduit means communicating with said interior of said airfoil;

torque-generating means journaled on said fuselage for rotation about a second axis and operatively connected to said rotary airfoil for selective rotation thereof and rotation thereby to exert a torque between said fuselage and said airfoil about said first axis, said torque-generating means including means for compressing a gaseous fluid and communicating with said conduit means; and means for selectively placing said torque generating means in a first condition exerting a torque on said airfoil for rotating the same and a second condition in which said airfoil exerts a torque on said torque generating means.

3. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an elongated slot communicating with the interior of said airfoil for discharging a rearward jet of a gaseous fluid for rotating said airfoil in said sense;

power means on said fuselage for compressing said gaseous fluid;

conduit means communicating between said power means and said interior of said airfoil for supplying said gaseous fluid to said airfoil for discharge through said slot during powered rotation of said airfoil; and torque-generating blower means including said power means journaled on said fuselage for rotation about a second axis transverse to said first axis and operatively connected to said rotary airfoil for selective rotation thereof and rotation thereby to exert a torque between said fuselage and said airfoil about said first axis, said blower means having an air intake perpendicular to said first axis communicating with said conduit means, an impeller rotatably mounted adjacent said intake for traversal by air flowing through said intake and said conduit means, and mechanism for varying the torque supplied to said impeller, said mechanism including adjustable guide means for imparting to air entering said intake a twist about said second axis.

4. A helicopter as defined in claim 3 wherein said guide means includes a ring adjacent said inlet, and guide vanes angularly spaced about said ring.

5. A helicopter as defined in claim 4 wherein said vanes are each pivotally mounted upstream of a center of air pressure thereon, further comprising respective spring means bearing upon each vane for biasing it in a direction at a large angle to said second axis against the force of air entering said intake whereby the greater the air flow, the smaller is said angle, and common manual actuating means for said vanes for varying said angle upon autorotation of said airfoil.

6. A helicopter as defined in claim 3 wherein said mechanism includes means for adjusting the axial position of said impeller relatively to said intake to regulate the proportion of air traversing said impeller.

7. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an outlet communicating with the interior of said airfoil for discharging a rearward jet of a gaseous fluid for rotating said airfoil in said sense;

power means on said fuselage for compressing said gaseous fluid;

conduit means communicating between said power means and said interior of said airfoil for supplying said gaseous fluid to said airfoil for discharge through said outlet during powered rotation of said airfoil; and torque-generating blower means including said power means journaled on said fuselage for rotation about an axis transverse to said first axis and operatively connected to said rotary airfoil for selective rotation thereof and rotation thereby to exert a torque between said fuselage and said airfoil about said first axis, said blower means having an air intake communicating with said conduit means, an axial-flow impeller rotatably mounted adjacent said intake for traversal by air flowing through said intake and said conduit means, and mechanism including adjustable means cooperating with said impeller for varying the torque exerted on the same by air flowing through said intake.

8. A helicopter as defined in claim 7 wherein said mechanism includes variable-speed transmission means interposed between said impeller and said rotary airfoil, and manual actuating means for regulating said transmission means.

9. A helicopter as defined in claim 7 wherein said impeller is provided with a plurality of adjustable-pitch blades and adjusting means for reducing the pitch of said blades upon decrease of the rate of flow of air through said intake.

10. A helicopter as defined in claim 9 wherein said adjusting means includes means for pivotally mounting said blades on said impeller, spring means effective to urge said blades to a maximum blade angle, and means for setting said blades against the force of said spring means in accordance with said rate of flow of air through said intake.

11. A helicopter as defined in claim 10 wherein said means for setting said blades includes a plate subject to dynamic pressure of air and mounted for movement axially of said impeller and link means connecting said plate and said blades for adjustment thereof.

12. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an outlet communicating with the interior of said airfoil for discharging a rearward jet of a gaseous fluid for rotating said airfoil in said sense;

power means on said fuselage for compressing said gaseous fluid;

conduit means communicating between said power means and said interior of said airfoil for supplying said gaseous fluid to said airfoil for discharge through said outlet during powered rotation of said airfoil;

torque-generating blower means journaled on said fuselage for rotation about a second axis and operatively connected to said rotary airfoil for selective rotation thereof and rotation thereby to exert a torque between said fuselage and said airfoil about said first axis, and adjusting means operatively connected with said torque-generating blower means for regulating said torque, said adjusting means being responsive to angular movement of the longitudinal axis of the fuselage from the direction of horizontal travel and including an element extending to two points symmetrically disposed with respect to said longitudinal axis and being thereby subjected to a difference in dynamic pressure depending on the angular displacement of said longitudinal axis from said direction of travel so that said torque-generating blower means adjusts the angular position of said fuselage until said longitudinal axis extends in said direction of travel.

13. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an elongated slot communicating with the interior of said airfoil for discharging a rearward jet of a gaseous fluid for rotating said airfoil in said sense;

power means on said fuselage for compressing said gaseous fluid, said power means upon immobilization resisting air flow therethrough;

conduit means communicating between said power means and said interior of said airfoil for supplying said gaseous fluid to said airfoil for discharge through said slot during powered rotation of said airfoil;

torque-generating blower means journaled on said fuselage for rotation about a second axis and operatively connected to said rotary airfoil for selective rotation thereof and rotation thereby to exert a torque between asid fuselage and said airfoil about said first axis; and control means including said conduit means for supplying a quantity of air to the interior of said airfoil for discharge through said slot upon autorotation of said airfoil during immobilization of said power means sufficient to permit said autorotation at a rate approximating the rate of rotation of said airfoil during powered rotation whereby said autorotation of said airfoil controls descent of said fuselage during immobilization of said power means, said control means including valve means communicating between the surrounding atmosphere and said conduit means and held normally closed by the pressure of said gaseous fluid in said conduit means for admitting said air to said conduit means upon immobilization of said power means.

14. A helicopter comprising:

a fuselage;

a rotary airfoil journaled on said fuselage for rotation about a generally upright first axis in a lift-generating sense while extending transversely to said first axis, said rotary airfoil being hollow and provided with a trailing edge formed with an elongated slot communicating with the interior of said airfoil for discharging a rearward jet of a gaseous fluid for rotating said airfoil in said sense;

power means on said fuselage for compressing said gaseous fluid, said power means upon immobilization resisting air flow therethrough;

conduit means communicating between said power means and said interior of said airfoil for supplying said gaseous fluid to said airfoil for discharge through said slot during powered rotation of said airfoil;

torque-generating blower means including said power means journaled on said fuselage for rotation about a second axis transvesre to said first axis and operatively connected to said rotary airfoil for selective rotation thereof and rotation thereby to exert a torque between said fuselage and said airfoil about said first axis, said blower means having an air intake perpendicular to said first axis communicating with said conduit means, an axial-flow impeller rotatably mounted adjacent said inlet for traversal by air flowing through said intake and said conduit means, and mechanism for varying the torque supplied to said impeller; and control means including said conduit means for supplying a quantity of air to the interior of said airfoil for discharge through said slot upon autorotation of said airfoil during immobilization of said power means sufficient to permit said autorotation at a rate approximating the rate of rotation of said airfoil during powered rotation whereby said autorotation of said airfoil controls descent of said fuselage during immobilization of said power means, said control means including valve means communicating between the surrounding atmosphere and said conduit means and held normally closed by the pressure of said gaseous fluid in said conduit means for admitting said air to said conduit means upon immobilization of said power means.

References Cited by the Examiner

UNITED STATES PATENTS

| | | | |
|---|---|---|---|
| Re. 23,448 | 12/51 | Pullin | 170—135.4 |
| 2,408,489 | 10/46 | Stalker | 170—135.4 |
| 2,433,251 | 12/47 | Whiting | 244—17.19 |
| 2,481,749 | 9/49 | Hiller | 244—17.19 |
| 2,493,042 | 1/50 | Stalker | 170—135.4 |
| 2,516,489 | 7/50 | Stalker | 170—135.4 |
| 2,553,253 | 5/51 | Hays | 170—135.4 |
| 2,556,710 | 6/51 | Stalker | 170—135.4 |
| 2,656,892 | 10/53 | Campbell | 170—135.4 |
| 2,667,226 | 1/54 | Doblhoff | 170—135.4 |
| 2,688,371 | 9/54 | Pesaro | 170—135.4 |
| 2,689,615 | 9/54 | Fletcher | 170—135.4 |
| 2,759,548 | 8/56 | Yuan et al. | 170—135.4 |
| 2,818,223 | 12/57 | Doblhoff | 244—17.19 |

JULIUS E. WEST, *Primary Examiner.*